INVENTOR.
WALLACE S. KREISMAN

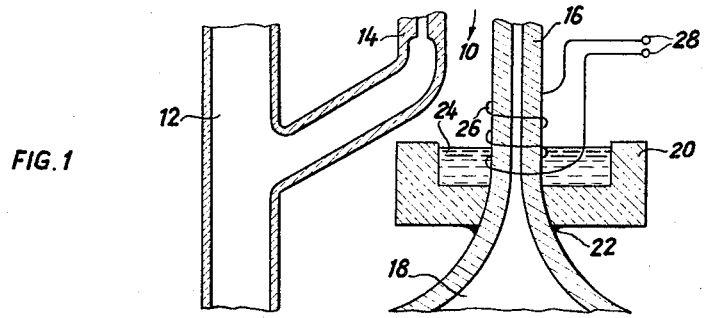
FIG. 1
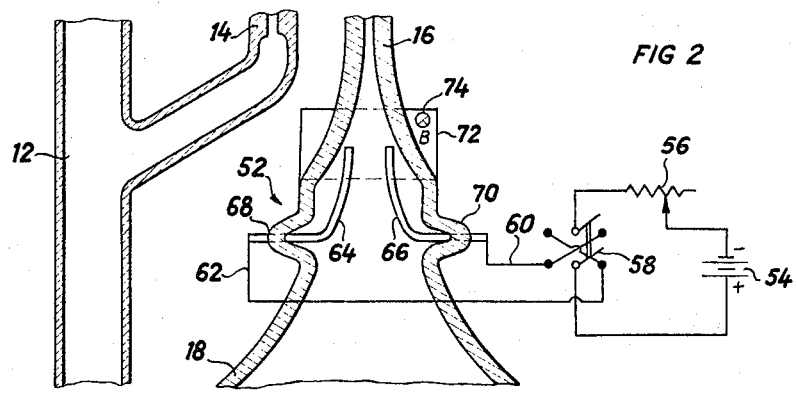
FIG 2
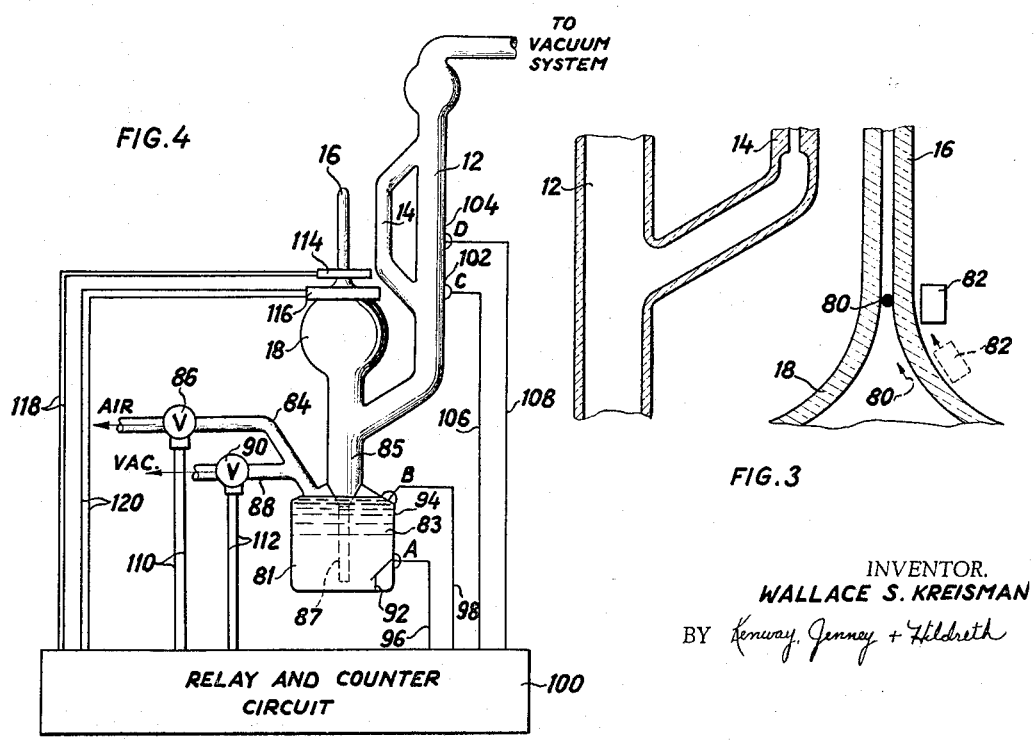
FIG. 4
FIG. 3
INVENTOR.
WALLACE S. KREISMAN

United States Patent Office 3,285,271
Patented Nov. 15, 1966

3,285,271
LOW PRESSURE GAUGE
Wallace Samuel Kreisman, Malden, Mass., assignor to GCA Corporation, a corporation of Delaware
Original application Dec. 5, 1962, Ser. No. 242,543, now Patent No. 3,217,545, dated Nov. 16, 1965. Divided and this application Apr. 23, 1965, Ser. No. 459,971
3 Claims. (Cl. 137—251)

This invention relates to a gauge for measuring low pressures or vacuums and more particularly to an improved multiple compression McLeod gauge. This application is a division of application Serial No. 242,543, Low Pressure Gauge, filed December 5, 1962, now U.S. Patent No. 3,217,545.

Ever since the McLeod gauge was introduced in the year 1874, it has been well recognized as an absolute pressure standard. The mercury McLeod gauge is universally accepted as the best available absolute pressure measuring device in the pressure region from about $1 \times 10^{-4}$ torr to 1 torr. Recent developments of this gauge have extended its range to about $10^{-7}$ torr pressure where measurements may be made but with reduced accuracy. Although since its introduction many improvements have been made in its physical design the fundamental principle of operation has remained unchanged.

The present invention relates to an improved low pressure gauge and more particularly to an improved McLeod gauge. The improved gauge of the present invention not only may be used over a lower pressure range as well as in the conventional pressure region, but is more accurate than previous constructions throughout its entire range of operation. This improved accuracy and extended range of operation is brought about by an improved arrangement utilizing multiple compression, making it possible to gauge a larger quantity of sampled gas. In the present invention, sequential gas samples are trapped or isolated by a novel valving arrangement so as to make it possible to accumulate large samples of gas to be measured.

It is, therefore, a primary object of the present invention to provide an improved low pressure gauge.

Another object of the present invention is to provide an improved McLeod gauge.

Another object of the present invention is to provide an automatic multiple compression McLeod gauge.

Another object of the present invention is to provide a novel valve arrangement for low pressure gauges.

Another object of the present invention is to provide a low pressure gauge having improved accuracy and extended range of operation.

These and further objects and advantages of the invention will be more apparent upon reference to the following specification, claims and appended drawings wherein:

FIGURE 1 shows a portion of an improved McLeod gauge constructed in accordance with the present invention.

FIGURE 2 shows a modified embodiment of the novel gauge of the present invention.

FIGURE 3 shows a preferred modification.

FIGURE 4 shows an automatic multiple compression McLeod gauge constructed in accordance with this invention;

Figure 5:
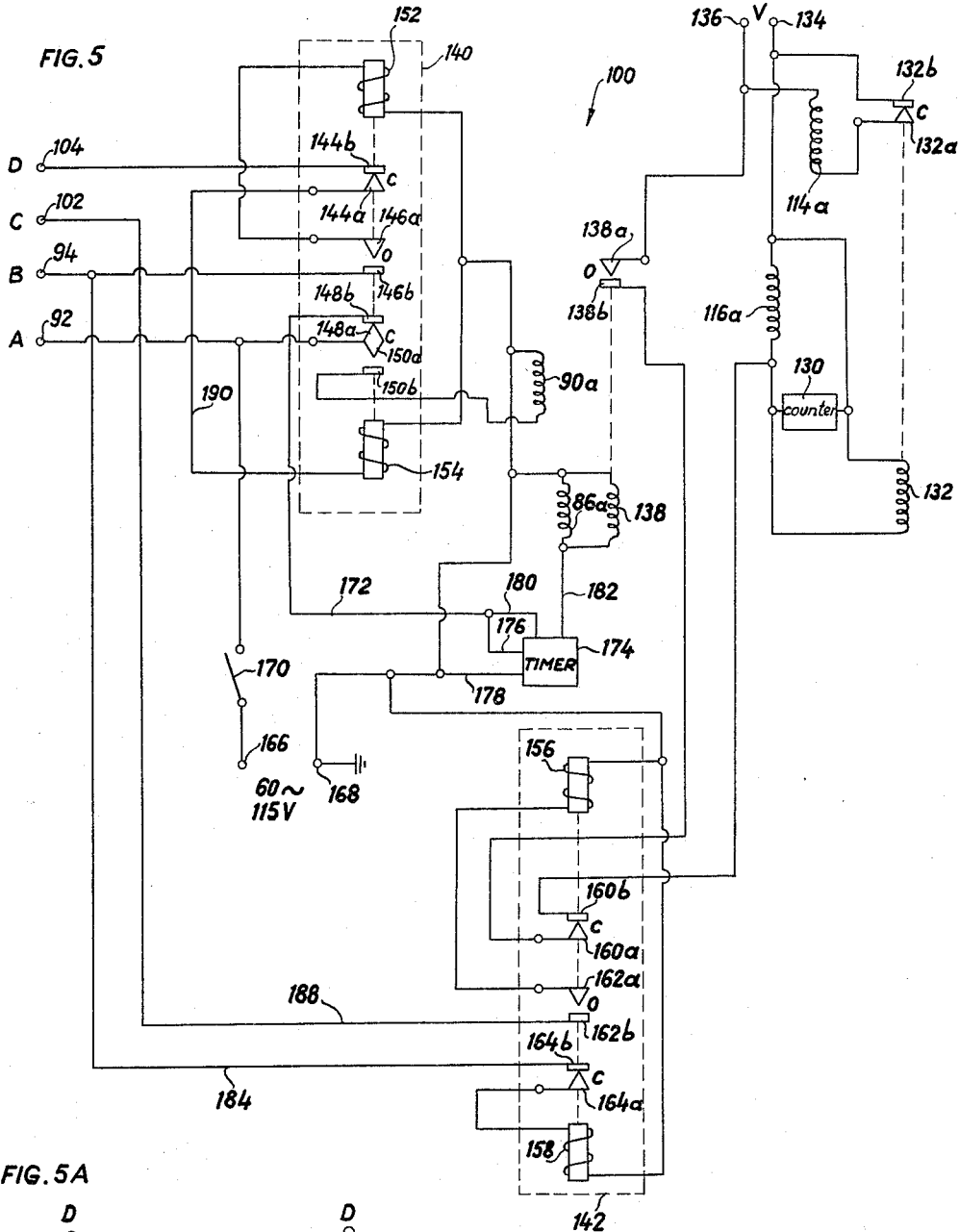
FIGURE 5 is a circuit diagram of the control system for the automatic gauge of FIGURE 4.

The McLeod gauge is essentially a mercury monometer having a built-in pressure amplification arrangement. The pressure amplification portion of a low pressure gauge consists of a large volume (1 to 2 liter) compression bulb and a small volume (1 to $2 \times 10^{-4}$ liter) closed capillary tube that has a diameter of the order of 1 mm. The gas (at an unknown pressure P) that is to be measured is introduced into the compression bulb and closed capillary (having a total volume of V). It is then compressed by mercury until it occupies a much smaller volume $v$ in the closed capillary and has attained a much higher pressure $P_F$. The final pressure $P_F$ is determined by comparing the height of the mercury in the closed capillary with the height of the mercury in an adjacent identical (same diameter) open capillary in the same way that a measurement is made with a U-tube monometer. Boyle's law is assumed to hold so that the unknown pressure is computed from the proportion $$\frac{P}{P_F} = \frac{v}{V}$$

The pressure range that is covered by a McLeod gauge ordinarily depends on the volume of the compression bulb and the length and diameter of the closed capillary. In principle, there is no reason why McLeod gauges cannot be built with gigantic steel compression bulbs, storage containers, etc. and relatively large bore capillaries. However, from a practical standpoint, the increases in complexity, cost and cumbersomeness of such a system makes its usefulness questionable. As the size of the McLeod gauge increases, it results in a requirement for greater capacity pumping equipment, bake-out facilities and the like.

Because of variable capillarity and other effects that are not well known, there is an error in the positions of the mercury columns after a gas is compressed in a McLeod gauge. Systematic errors in the positions of the mercury and capillaries that are about 1 mm. in diameter may be as large as several millimeters. When the gas pressure is sufficiently high, these errors can be found and corrected by using a variable compression ratio technique. However, in addition to the systematic errors, there are experimental errors of the order of several tenths of a millimeter in the positions of the mercury columns. To obtain pressure measurement accuracies of the order of one percent with the conventional McLeod gauge, it is necessary that the pressure being measured, say $P_0$, be sufficiently high so that when the bulb gas is compressed and forced into the closed capillary, the final pressure $P_F$ be 100 times larger than the errors in the mercury column positions. In other words, it can be said that a minimum value of final pressure $P_F$ is required to achieve a given accuracy or, even more fundamentally, that a minimum quantity of gas $Q_0$ is required for a particular gauge to achieve a given accuracy.

The novel construction of the present invention substantially increases the range and accuracy by modifying a conventional McLeod gauge so that more than one compression of the calibrating gas can be made for a single measurement, the gas being stored after each compression cycle so that it is possible to obtain a larger quantity of gas from gas at any initial pressure than would conventionally be obtained. Multiple compression in a McLeod gauge has been previously proposed using a float valve arrangement. This construction has never been commercially successful, probably because it requires a substantial modification of the gauge structure. In addition, higher pressure gas in the float valve chamber can only be pumped out slowly through the float valve. The present invention overcomes these difficulties by providing a multiple compression gauge which requires little or no modification of the basic gauge and which permits rapid pumping of the gas. One such arrangement is illustrated in FIGURE 1.

FIGURE 1 shows a portion of a conventional McLeod gauge modified in accordance with the present invention. The gauge generally indicated at 10 includes a vacuum conduit 12 connected to the vacuum system and having branching off therefrom a small comparison capillary 14. Positioned adjacent the comparison capillary is a closed end capillary 16 communicating with a conventional compression bulb 18. The foregoing elements are standard parts of a conventional McLeod gauge.

The novel portions of the present invention illustrated in FIGURE 1 include a circular heat insulating container 20 surrounding the neck of the compression bulb 18 communicating with the closed end capillary 16. The insulating container 20 is secured to the neck of the bulb by any suitable arrangement such as cement shown at 22. Container 20 is filled with a liquid Dry Ice-acetone mixture 24 and the lower portion of the closed end capillary is surrounded by this mixture and by a heating coil 26 connected to a suitable source of heating current by way of terminals 28.

The valving arrangement illustrated in FIGURE 1 isolates the gas in the closed capillary to produce gas storage by freezing a small quantity of mercury below the compressed gas in the capillary 16. A Dry Ice-acetone mixture is illustrated since mercury freezes at $-38.9°$ C. However, the freezing can be done with any suitable commercial refrigeration equipment, thermoelectric equipment, Dry Ice, liquid nitrogen or the like. Similarly, the mercury may be warmed above its melting point by suitable heating arrangements other than the heating coil 26 illustrated in FIGURE 1.

In operation of the gauge of FIGURE 1 the base of the capillary 16 surrounded by the Dry Ice-acetone mixture 24 is maintained at a temperature below $-38.9°$ C. The gas being measured is compressed in the bulb 18 in the normal fashion and the mercury allowed to enter the cold part of the closed capillary. After a few minutes the upper part of the mercury in the capillary freezes and the compressed gas is trapped above the frozen plug of mercury.

The liquid mercury is separated from the frozen plug by lowering it from the compression bulb in the normal way. The liquid mercury is lowered below the compression bulb cut-off level so that a second sample of the gas being measured enters the compression bulb. The second sample is compressed in the same way as the first except that now a gap of 1 or 2 centimeters is left between the free surface of the liquid mercury and the bottom of the frozen mercury plug.

The next step is to warm the frozen mercury plug with the heating coil 26 so that the mercury plug melts and falls down into the liquid mercury just a few centimeters below. The final step is to turn off the heating current and to cool down the capillary again, raise the liquid mercury into the cold part of the capillary once more and again create a frozen plug to trap the two samples of compressed gas. This entire process is repeated as many times as required to build up the desired final pressure in the closed capillary 16. To make a measurement of the pressure after $n$ cycles of compression it is only necessary to allow the cold part of the capillary to warm up to room temperature (preferably accelerated by using the heating coil 26) and raise the mercury to its final position as is done in taking an ordinary single compression reading in a conventional McLeod gauge.

An important feature of the construction illustrated in FIGURE 1 is that it requires no changes in the conventional McLeod gauge structure but only the addition of external elements to the system. The gauge may not only be used for a plurality of samples but may be used with a single sample in the exact manner of a conventional gauge if desired.

FIGURE 2 shows a modified embodiment with like parts bearing like reference numerals. In FIGURE 2 the lower end of the closed end capillary 16 is provided with what might be called an electromagnetic mercury valve illustrated generally at 52. In FIGURE 2, D.C. power from a suitable power supply such as battery 54 supplies electrical energy through variable resistor 56 and switch 58 by way of leads 60 and 62 to a pair of upwardly extending current electrodes 64 and 66. Electrodes 64 and 66 may be formed of any suitable material such as glass beaded tungsten wire and pass into the interior of the unit through suitable vacuum seals at 68 and 70. A permanent magnet 72 external of the unit in a position adjacent the electrodes 64 and 66 provides a transverse magnetic field as indicated by the arrow 74 in FIGURE 2.

In the arrangement of FIGURE 2 as in the mercury freezing arrangement of FIGURE 1, the mercury itself is used to confine the compressed gas in the closed capillary. When the mercury is raised between the electrodes 64 and 66 and into the field of permanent magnet 72, direct current of the proper polarity from one electrode to the other through the mercury in the presence of the transverse magnetic field produces an upward force on the mercury. The magnitude of the current is adjusted by variable resistor 56 so that the upward electromagnetic force just balances the weight of the mercury and the force of the confined gas. The method of operation for obtaining sequential samples of the gas is identical to that previously described in conjunction with the valve arrangement shown in FIGURE 1.

FIGURE 3 shows a preferred modification with like parts again bearing like reference numerals. In FIGURE 3 a magnetic sphere 80 acts as a valve to store gas in the closed end capillary 16. The sphere 80 may be made of any suitable magnetic material, such as pure iron, ferritic stainless steel, nickel, Kovar, or the like and is used to open or close the entrance from the compression bulb 18 to the closed end capillary 16. The diameter of the sphere is preferably chosen to be slightly greater than the inside diameter of the closed capillary 16. Either electromagnets or a permanent magnet such as 82 may be used to move the sphere 80 so as to open and close the valve. When the permanent magnet 82 is moved from the dashed line position illustrated in FIGURE 3 in the direction of the arrow to the solid line position, the sphere 80 will likewise move from the dashed line position in the direction of the arrow in FIGURE 3 to the solid line position illustrated.

The magnetic sphere valve of FIGURE 3 for storing gas in a McLeod gauge has a number of advantages. First, it requires no modification of the gauge itself. It is only necessary to introduce a small sphere of known dimensions into the compression bulb volume and hold it against the side of the glass with an external magnet field. Second, if the sphere is of the preferred order of approximately $\frac{1}{16}$ of an inch in diameter, its volume is negligible as concerns calibration of the gauge. If made of the proper materials, such as those mentioned above, the sphere will have no inter-action with the mercury and can be outgassed at temperatures up to 450° C. with no difficulty. A permanent magnet such as 82 of Alnico VIII can be used to hold the sphere during the outgassing process. In the operation of this valve, the magnetic sphere is used to support a column of mercury that is several cm. in length at the base of capillary 16. It is the column of mercury that actually provides the positive, gas-tight seal that is required to store gas in the closed capillary.

In using the novel gauge of the present invention employing any one of the valves illustrated in FIGURES 1 through 3, it is possible to either make a pressure measurement after each new sample of gas is added to the closed end capillary or to simply add the gas sample and go on to the next compression cycle. If a measurement is made after the addition of each gas sample a set of variable compression ratio measurements are acquired which lead to a single value of the pressure being measured. These measurements can be used to determine the systematic errors in the gauge system.

When making multiple compression measurements, the operator would ordinarily take a measurement of the gas pressure after the first compression cycle. This is done in order to get some idea of the number of compression cycles required to attain the desired accuracy. If the pressure being measured is below the normal range of the gauge a so-called "stick" vacuum is obtained after the first compression cycle. The procedure at this point is to carry out additional compression cycles, say ten, make a second measurement and proceed further if necessary. Of course, the mercury in the gauge must be well enough outgassed and the system background pressure low enough so that a zero reading for the background gas pressure after $n$ cycles is obtained for use in measuring the calibrating gas pressure. If the vacuum system is of the continuous flow variety a simple derivation yields the following equation for a multiple compression gauge constructed in accordance with the present invention used for $n$ cycles in the manner previously described.

$$P = \frac{\sigma h_c h_d}{[V + (n-1)V'] - \sigma h_c}$$

where the symbols above have the following meaning:

$P$ = sample gas pressure being measured (mm. Hg)
$V'$ = volume of the compression bulb (cm.$^3$)
$V$ = volume of the compression bulb plus the closed end capillary (cm.$^3$)
$\sigma$ = cross sectional area of the closed end capillary expressed in units cm.$^3$/mm. length
$h_c$ = length of the closed end capillary that is not occupied by mercury after the last compression (mm.)
$h_d$ = vertical difference in height between the mercury menisci in the closed and open capillaries after the last compression (mm.)
$n$ = total number of compression cycles For a low pressure McLeod gauge that has a large bulb volume (say several hundred cm.$^3$) and a small diameter closed end capillary, the term $v - \sigma h_c$ can be closely approximated by $V'$, so that the operating equation simplifies to:

$$P = \frac{\sigma}{nV'} h_c h_d = K_n h_c h_d$$

In this case, the pressure can be easily computed with the aid of a gauge constant $K_n$ whose value depends on the number of compression cycles.

FIGURE 4 is a schematic diagram of an automatic multiple compression gauge constructed in accordance with the present invention with like parts again bearing like reference numerals. The upper end of conduit 12 is connected to the vacuum system and is provided with the branched comparison capillary 14. The closed end capillary 16 is positioned adjacent comparison capillary 14 and at the same height. Compression bulb 18 communicates with a mercury reservoir 81 shown filled with mercury 83 by way of a tube 85 having its lower end 87 extending downwardly into the mercury near the bottom of the reservoir. Reservoir 81 communicates by way of conduit 84 and air solenoid valve 86 with a suitable air or gas supply and by way of conduit 88 and vacuum solenoid valve 90 with an auxiliary vacuum system.

A pair of electrical contact wires 92 and 94 labelled A and B are provided in the reservoir 81 and are electrically connected through suitable seals by way of leads 96 and 98 to a relay and counter circuit unit 100. Similar electrical contacts 102 and 104, labelled C and D, pass into the interior of conduit 12 through suitable seals and are connected by way of leads 106 and 108 to unit 100.

Solenoid valve 86 is operated from the relay and counter circuit unit 100 by way of leads 110 and similar leads 112 connect solenoid valve 90 to the unit 100. A pair of alternately energized electromagnets 114 and 116 are positioned adjacent the lower end of closed capillary 16 and these electromagnets are used to position a sphere of the type illustrated at 80 in FIGURE 3 which acts to close the opening to the lower end of capillary 16 when the electromagnet 114 is energized and moves downwardly to open the valve when electromagnet 116 is energized. These two electromagnets are operated from the relay and counter circuit unit 100 by way of leads 118 and 120, respectively.

In the operation of the automatic unit illustrated in FIGURE 4, when the gauge mercury is travelling downwardly into the reservoir 81, it closes the electrical path between contact wires 92 and 94 and the air or gas solenoid valve 86 is opened after an adjustable time delay of conventional type provided by the unit 100. When air or gas enters the reservoir the mercury rises in the gauge and eventually reaches the contact 102 which is located in a horizontal plane a few centimeters below the bottom of the closed capillary 16. When the mercury completes the circuit between the two spaced contacts 92 and 102 the storage valve electromagnet 116 is energized so as to open the storage valve and thus permit previously stored gas to be combined with the new sample.

The mercury continues to rise in the gauge and finally reaches the contact 104. Completion of the circuit between contacts 92 and 104 energizes electromagnet 114 to close the spherical storage valve, closes the air solenoid valve 86, and opens the vacuum solenoid valve 90 thereby causing the mercury to be lowered. When the lowering mercury finally reaches the reservoir and closes the circuit between contacts 92 and 94, the vacuum solenoid valve 90 closes and after a short time delay provided by the unit 100, the air solenoid valve 86 is opened and the entire cycle repeated. A counting circuit may be connected to one of the storage valve electromagnets 114 or 116 to indicate the number of stored gas samples. Such a counting circuit can be pre-set in a conventional manner so that after a specified number of gas samples have been stored, both the air and vacuum solenoid valves are closed with the mercury in the raised position. Similarly, a visual or audible signal can be activated in a well known manner to indicate the completion of the operation.

FIGURE 5 is a circuit diagram showing the details of the relay and counter circuit 100 of FIGURE 4 for the automatic control of the multiple compression gauge. In FIGURE 5 the coil for the upper electromagnet 114 is indicated at 114a and the coil for the lower electromagnet 116 is illustrated at 116a. The coil for the air solenoid valve 86 is illustrated in FIGURE 5 at 86a and the coil for the vacuum solenoid valve 90 is similarly illustrated at 90a.

A counter 130 is connected across the lower electromagnet coil 116a and is also in parallel with relay coil 132 having a movable contact 132a and a stationary contact 132b. These contacts are in series with the upper electromagnet coil 114a across supply terminals 134 and 136 coupled to a suitable source of A.C. or D.C. electrical energy for energizing the electromagnets. Terminal 136 is connected to the contacts 138a and 138b of relay 138, in turn connected across the air solenoid valve coil 86a.

The sealed-in electrical contacts 92, 94, 102 and 104, labeled A through D, are connected to a pair of latching relays indicated by the dashed line boxes 140 and 142. Relay 140 is provided with a plurality of movable contacts 144a, 146a, 148a and 150a and corresponding stationary contacts 144b, 146b, 148b and 150b. Adjacent each set of contacts is a small letter "o" or a small letter "c" indicating that the contacts are either normally open or normally closed. When the upper solenoid 152 of relay 140 is energized, the ganged movable contacts move into the upper position illustrated in FIGURE 5. The contacts are latched in this position in a conventional manner and remain there until the lower relay solenoid 154 is energized drawing the movable contacts downwardly where they are likewise latched until the upper solenoid 152 is subsequently energized. Latching relay 142 is similarly provided with latching solenoids 156 and 158, movable contacts 160a, 162a and 164a and corresponding stationary contacts 160b, 162b and 164b.

Terminals 166 and 168 are connected to a suitable 60-cycle 115 volt line supply with terminal 168 connected to the common ground. Sealed-in contact 92 is coupled to the A.C. supply by way of a manual switch 170. The A.C. supply is also connected through relay contacts 148a and 148b by way of lead 172 to a timer 174, which inserts a time delay into the circuit. Timer 174 may be of any suitable construction but is preferably of the conventional bi-metallic thermal delay type including heater input terminals 176 and 178 which, after a suitable delay, complete a circuit from input lead 180 to timer output lead 182.

In operation, and referring to FIGURES 4 and 5, when the manual switch 170 is closed energy is supplied to sealed-in terminal 92 labeled A. Terminal A is electrically coupled to terminal B by the conductive mercury 83 in the reservoir, thus completing a circuit to lower solenoid 158 of latching relay 142 by way of terminal 94, lead 184, closed contacts 164a–b and lead 186 to common return terminal 168. Energization of solenoid 158 draws the movable contacts of relay 142 into their lowermost position causing contacts 160a–b and 164a–b to open and contacts 162a–b to close. The opening of contacts 164a–b de-energizes solenoid 158 but the movable contacts remain in the downward position because of the latching action of the relay. Opening of contacts 160a–b opens a second point in the circuit to lower electromagnet coil 116a. The closure of contacts 162a–b has no immediate effect on the circuit.

With the closure of manual switch 170, heater current is supplied to the timer 174 which after a suitable delay completes the circuit through relay contacts 148a–b by way of lead 172 to timer output 182. This energizes air solenoid valve coil 36a, opening the valve so as to pressurize the system and also energizes relay 138 closing the contacts 138a–b. As pressure is supplied to the system through the air valve 90 in FIGURE 4, the mercury in the reservoir passes upwardly from the bottom of the reservoir into the lower end 87 of the tube 85, and upwardly through this tube into the conduit 12 and compression bulb 18. The mercury in the reservoir falls away from contact B, but with sufficient mercury in the reservoir, the mercury is at all times in electrical contact with the sealed contact 92 labelled A.

As the mercury rises in the system, it reaches a level a few centimeters below the storage valve, where it completes the circuit from terminal A to terminal C. Closure of the circuit between contacts A and C by way of the conductive mercury causes the circuit to be completed between previously closed contacts 162a–b by way of lead 188. This energizes upper solenoid 156 of relay 142 causing the movable contacts to move back to the upper position illustrated in FIGURE 5. The closure of contacts 160a–b completes the circuit from the control terminals 134 and 136 through lower electromagnet coil 116a which acts to draw the magnetizable ball away from the lower end of the closed capillary 16 in FIGURE 4 to open the storage valve. At the same time coil 116a is energized, a counting impulse is supplied to counter 130 and relay 132 is energized opening contacts 132a–b, which latter contacts de-energize the upper electromagnet coil 114a. At this time, the storage valve is open and the first gas sample has access to the closed end capillary 16 through the open storage valve. Further rise of the mercury into the lower end of the closed capillary drives the gas sample upwardly into the closed end capillary.

When the mercury has risen a short distance into the closed end capillary 16, the mercury engages contact D in conduit 12 completing the circuit from A to D by way of the conductive mercury. This completes the circuit through closed contacts 144a–b by way of lead 190 to the lower solenoid 154 of latching relay 140 which causes the movable contacts of this relay to move into the downward position in which position they are latched. The opening of contacts 144a–b with energization of the relay breaks the circuit to the solenoid 154 leaving the relay latched in the downward position. The closure of contacts 146a–b has no immediate effect on the circuit. The opening of contacts 148a–b breaks the circuit to the air solenoid valve coil 86a permitting the valve 86 to close and also breaks the circuit to relay 138 permitting contacts 138a–b to open. The opening of these latter contacts breaks the circuit to the solenoid coil 116a which when de-energized releases the magnetizable ball which floats upwardly in the mercury to engage the lower end of the closed capillary 16. At the same time, the circuit to relay 132 is broken permitting contacts 132a–b to close so as to re-energize coil 114a to hold the magnetizable ball by means of the upper electromagnet 114 in position closing the storage valve. Closure of contacts 150a–b completes the circuit to coil 90a which opens vacuum valve 90. Opening of the vacuum valve 90 causes the mercury to be gradually withdrawn from the conduit 12 and the compression bulb 18 back into the reservoir 81.

The mercury is gradually lowered in the system until such a time as the mercury in the reservoir again completes the circuit between terminals A and B. This completes a circuit to upper solenoid 152 of latching relay 140 by way of now closed contacts 146a–b causing the movable contacts of this relay to return to the upper position illustrated in FIGURE 5. Opening of contacts 150a–b breaks the circuit to the vacuum solenoid valve coil 98 causing this valve to close. The closure of contacts 148a–b applies energy again to the timer 174 which, after a sufficient length of time to permit the mercury to settle initiates a second complete cycle.

Figure 5A:
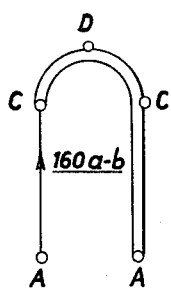
FIGURES 5A and 5B show the closing sequence for the electromagnet control contacts of FIGURE 5.

As can be seen, the control circuit of FIGURE 5 acts to automatically control the system of FIGURE 4 to provide successive multiple compressions of any desired number. This is made possible by the automatic control of the electromagnets 114 and 116 which are alternatively energized to either open or close the storage valve. When magnet 114 is energized, electromagnet 116 is de-energized and vice versa. The action of the contacts for controlling these two electromagnets are illustrated in FIGURES 5A and 5B.

As previously explained, sufficient mercury is provided in the reservoir so that the mercury is at all times coupled to contact A. As the mercury falls away from contact B and rises to contact C in the direction of the arrow in FIGURE 5A, contacts 160a–b are open. These contacts close when the mercury engages sealed contact C and remain closed for the remainder of the cycle as indicated by the hatching in FIGURE 5A while the mercury passes from C upwardly to D, back down to C, until finally all the mercury returns into the reservoir and rises to complete the circuit to contact B.

Figure 5B:
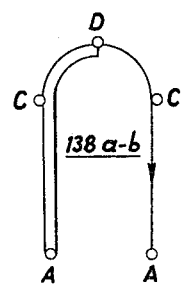

In FIGURE 5B, contacts 138a–b are illustrated as closed by the cross hatching during movement of the mercury from A through C to D. These contacts open when the mercury reaches the sealed contact D and remain open as the mercury falls from D, back past contact C, until the reservoir is refilled and the mercury completes the circuit to contact B. It is to be noted that both sets of contacts are simultaneously closed during the time that the mercury is rising from contact C to contact D, during which time coil 116a is energized so that electromagnet 116 holds the storage valve open and electromagnet 114 is simultaneously de-energized. It is only when both these sets of contacts are closed that the storage valve is open to receive a sample in the closed end capillary 16.

While a specific preferred embodiment of a control system for an automatic multiple compression McLeod gauge has been shown, it is apparent that other arrangements may be utilized. Rather than connected across the coil of electromagnet 116, the counter 130 may be connected across the terminals of the vacuum solenoid coil 90a. If the counter is of the predetermining type, its control contacts can be placed in series with the line voltage switch 170. The voltage V that energizes the electromagnets can be either direct or alternating voltage. Similarly, while sealed-in electrodes and latching relays are shown and described, other ways can be utilized to automatically control the operation of the gauge. For example, photoelectric or proximity pick-ups can be used to sense the various levels of the mercury. These proximity pick-ups are well known and can be used to sense changes in capacitance, inductance, or energy losses in a coil. One or more small magnets can be introduced into the gauge so as to float on the mercury surface within certain levels so that the mercury level can be detected magnetically.

It is apparent from the above that the present invention provides a novel valve arrangement and low pressure gauge which substantially increases the range of operation at the low pressure end and at the same time significantly increases the accuracy of the gauge over its entire range. This is brought about by a relatively simplified construction requiring in some instances no internal modification of the conventional gauge, and in all cases only minor modifications of the conventional system. In each instance, the gauge may be used in its normal manner if desired. Because of its simplicity the novel structure of the present invention preserves the relative simplicity of the basic McLeod gauge structure thus retaining all the original advantages of the conventional McLeod gauge.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A valve comprising a conduit for a first fluid, a pair of electrodes extending into said conduit for establishing an electric field transverse to and within said conduit, an electromagnetic means adjacent said electrodes for establishing a magnetic field perpendicular to said electric field and to the axis of said conduit, a pool of conductive fluid communicating with said conduit adjacent said electrodes and electromagnetic means, means comprising at least a source of direct current for energizing said electrodes and said electromagnetic means to draw a plug of conductive fluid from said pool into said conduit adjacent the electrodes and electromagnetic means to plug said conduit to flow of said first fluid therethrough.

2. Apparatus as defined in claim 1 including means for adjusting the magnitude and direction of current flow from said source of direct current.

3. Apparatus as defined in claim 1 wherein said electrodes are hermetically sealed through the wall of said conduit.

References Cited by the Examiner
UNITED STATES PATENTS

| | | | |
|---|---|---|---|
| 1,736,643 | 11/1929 | Beck | 103—1 |
| 2,536,813 | 1/1951 | Jones et al. | 137—251 X |
| 2,698,127 | 12/1954 | Bowlus | 103—1 |
| 2,743,492 | 5/1956 | Easton | 137—251 X |
| 3,023,576 | 3/1962 | Musgrave | 251—139 X |
| 3,052,253 | 9/1962 | Priaroggia et al. | 137—251 X |

ALAN COHAN, *Primary Examiner.*

ISADOR WEIL, WILLIAM F. O'DEA, *Examiners.*

D. H. LAMBERT, *Assistant Examiner.*